(12) United States Patent
Wang

(10) Patent No.: US 11,289,938 B2
(45) Date of Patent: Mar. 29, 2022

(54) WIRELESS CHARGING RECEIVING END, TERMINAL DEVICE AND METHOD FOR WIRELESS CHARGING

(71) Applicant: BEIJING XIAOMI MOBILE SOFTWARE CO., LTD., Beijing (CN)

(72) Inventor: Yanteng Wang, Beijing (CN)

(73) Assignee: Beijing Xiaomi Mobile Software Co, , Ltd., Beijing (CN)

( * ) Notice: Subject to any disclaimer, the term of this patent is extended or adjusted under 35 U.S.C. 154(b) by 231 days.

(21) Appl. No.: 16/587,632

(22) Filed: Sep. 30, 2019

(65) Prior Publication Data
US 2020/0251922 A1    Aug. 6, 2020

(30) Foreign Application Priority Data
Jan. 31, 2019   (CN) .......................... 201910099722.X

(51) Int. Cl.
| H02J 50/80 | (2016.01) |
| H02J 7/02 | (2016.01) |
| H02J 50/12 | (2016.01) |
| H02J 7/00 | (2006.01) |
| H02J 7/06 | (2006.01) |

(52) U.S. Cl.
CPC ........ *H02J 7/025* (2013.01); *H02J 7/007192* (2020.01); *H02J 7/06* (2013.01); *H02J 50/12* (2016.02); *H02J 50/80* (2016.02)

(58) Field of Classification Search
CPC .. H02J 7/025; H02J 50/80; H02J 50/12; H02J 7/007192; H02J 7/06; H02J 1/102; H02J 7/0045; H02J 2207/40; H02J 7/0029; H02J 50/10
See application file for complete search history.

(56) References Cited

U.S. PATENT DOCUMENTS

| 9,431,848 | B2 * | 8/2016 | Lee .......................... H02J 50/80 |
| 2006/0103355 | A1 | 5/2006 | Venkatraman et al. |
| 2014/0009109 | A1 | 1/2014 | Lee et al. |
| 2014/0009120 | A1 * | 1/2014 | Kim .......................... H02J 7/02 |
| | | | 320/138 |
| 2016/0172895 | A1 | 6/2016 | Lee et al. |

(Continued)

FOREIGN PATENT DOCUMENTS

| CN | 107482710 A | 12/2017 |
| CN | 108767909 A | 11/2018 |

(Continued)

OTHER PUBLICATIONS

Extended European Search Report in the European Application No. 19204658.9 dated May 25, 2020, (15p).

*Primary Examiner* — Nghia M Doan
(74) *Attorney, Agent, or Firm* — Arch & Lake LLP

(57) ABSTRACT

The present disclosure relates to a wireless charging receiving end, a terminal device and a method for wireless charging. The wireless charging receiving end includes an energy receiver, a receiving end processor and a wireless charging management chip. The receiving end processor is connected with the energy receiver and the wireless charging management chip, converts an alternating current into a direct current and modulates and demodulates wireless signals. The wireless charging management chip is connected with a battery, and controls charging of the battery.

3 Claims, 12 Drawing Sheets

(56) References Cited

U.S. PATENT DOCUMENTS

| | | | |
|---|---|---|---|
| 2016/0285311 A1 | 9/2016 | Masumoto et al. | |
| 2017/0346344 A1* | 11/2017 | Uchimoto | H02J 50/12 |
| 2018/0262057 A1 | 9/2018 | Lee et al. | |
| 2019/0036372 A1* | 1/2019 | Wang | G06F 1/26 |
| 2019/0348868 A1 | 11/2019 | Lee et al. | |

FOREIGN PATENT DOCUMENTS

| | | |
|---|---|---|
| CN | 108879841 A | 11/2018 |
| CN | 109217487 A | 1/2019 |
| EP | 2685601 A2 | 1/2014 |
| EP | 3439138 A1 | 2/2019 |

\* cited by examiner

WIRELESS CHARGING RECEIVING END, TERMINAL DEVICE AND METHOD FOR WIRELESS CHARGING

CROSS-REFERENCE TO RELATED APPLICATIONS

This application is based on and claims priority to Chinese Patent Application No. 201910099722.X, filed on Jan. 31, 2019, the entire contents of which are incorporated herein by reference.

TECHNICAL FIELD

The present disclosure generally relates to the technical field of charging, and more particularly, to a wireless charging receiving end, a terminal device and a method for wireless charging.

BACKGROUND

Along with development of wireless charging technologies, an increasing number of terminal devices, including many wearable devices and smart terminal devices, have started using the wireless charging technologies. Specifically, a charged terminal device, as a wireless charging receiving end, converts a wireless signal sent by a wireless charging transmitting end to obtain a corresponding charging signal provided an input signal of a power management chip to enable the power management chip to charge a battery of the terminal device. In a wireless charging technology, two solutions are required to improve charging power and efficiency: the first solution is to increase a current of a wireless charging signal under the condition of keeping a voltage constant, thereby increasing the power; and the second solution is to increase an input voltage under the condition of keeping a current constant, thereby increasing the power.

However, for the first solution of the two solutions, existence of direct current impedance and alternating current impedance of a receiving coil of a terminal device may cause serious heating of the coil when the current exceeds a certain threshold value, so keeping increasing the current may achieve a relatively limited power increase effect. For the second solution, a power management chip responsible for charging in the terminal device limits the input voltage (generally not more than 12V), so increasing the voltage may also increase the power to a limited extent. Thus it can be seen that, under limitations of the receiving coil and power management chip of the terminal device, the power may not be effectively increased by the related wireless charging solutions and charging efficiency is low.

SUMMARY

According to a first aspect of the present disclosure, a wireless charging receiving end is provided, which may include: an energy receiver, a receiving end processor and a wireless charging management chip, wherein the receiving end processor may be connected with the energy receiver and the wireless charging management chip, and may convert an alternating current into a direct current and modulate and demodulate wireless signals; and the wireless charging management chip may be connected with a battery, and may control charging of the battery.

According to a second aspect of the present disclosure, a terminal device is provided, which may include: a battery; a terminal device processor; and the wireless charging receiving end provided in the first aspect of the present disclosure, wherein the wireless charging receiving end may be connected with the battery and the terminal device processor.

According to a third aspect of the present disclosure, a method for wireless charging is provided, which may include that: an alternating current power signal sent by a wireless charging transmitting end is received; the alternating current power signal is converted into a direct current; and a battery is controlled to be charged using the direct current.

It is to be understood that the above general descriptions and detailed descriptions below are only examples and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the present disclosure. Instead, they are merely examples of apparatuses and methods consistent with aspects related to the present disclosure as recited in the appended claims.

The terminology used in the present disclosure is for the purpose of describing particular embodiments only and is not intended to limit the present disclosure. As used in the present disclosure and the appended claims, the singular forms "a", "an" and "the" are intended to include the plural forms as well, unless the context clearly indicates otherwise. It shall also be understood that the term "and/or" used herein is intended to signify and include any or all possible combinations of one or more of the associated listed items.

It shall be understood that, although the terms "first", "second", "third", etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to a judgment" depending on the context.

Figure 1:
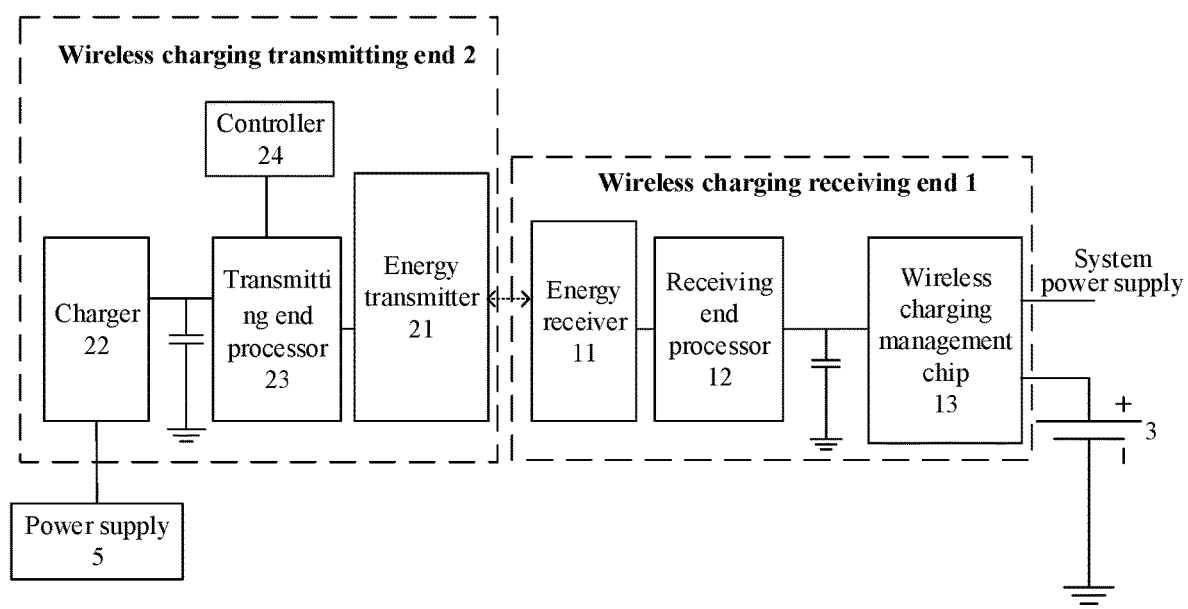
FIG. 1 is a block diagram of a wireless charging system, according to an embodiment of the present disclosure.

FIG. 1 is a block diagram of a wireless charging system, according to an embodiment. Referring to FIG. 1, the system may include a wireless charging transmitting end 2, a power supply 5 and a wireless charging receiving end 1. The power supply 5 is connected with the wireless charging transmitting end 2.

As shown in FIG. 1, the wireless charging transmitting end 2 may include an energy transmitter 21, a charger 22, a transmitting end processor 23 and a controller 24. The transmitting end processor 23 is connected with the energy transmitter 21, the charger 22 and the controller 24.

Figure 2:
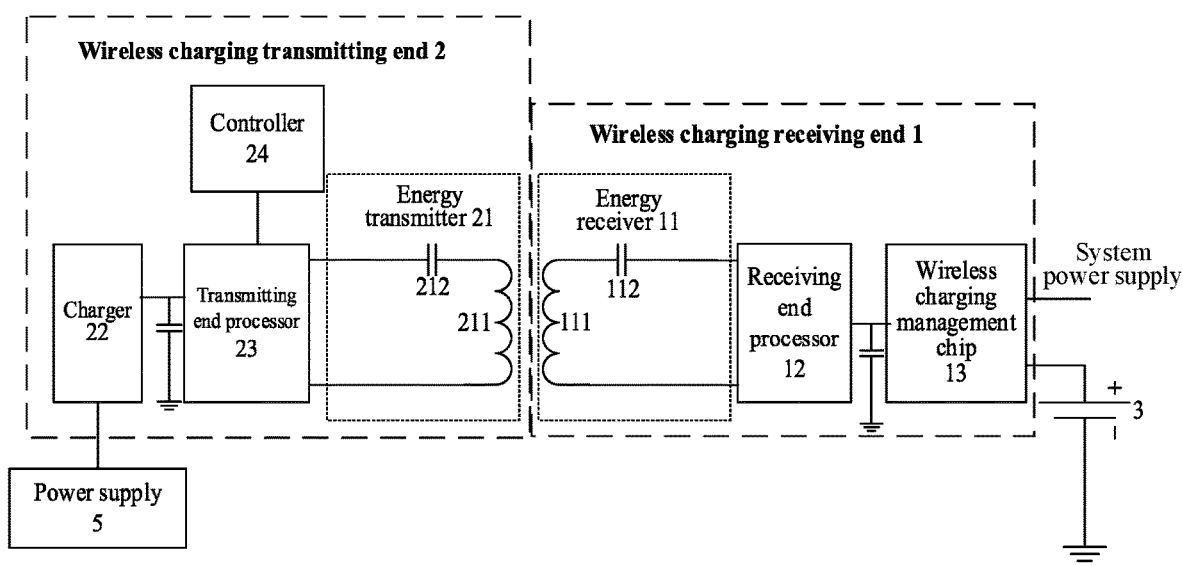
FIG. 2 is a block diagram of a wireless charging system, according to an embodiment of the present disclosure.

For example, as shown in FIG. 2, the energy transmitter 21 may include a transmitting end coil 211 and a transmitting end capacitor 212. The transmitting end processor 23 is connected with the transmitting end coil 211 through the transmitting end capacitor 212. The transmitting end processor 23 may include a full-bridge inverter circuit or a half-bridge inverter circuit, and the full-bridge inverter circuit or the half-bridge inverter circuit may be configured to convert a direct current into an alternating current. The controller 24 may be configured to control the full-bridge inverter circuit or the half-bridge inverter circuit, and may further be configured to modulate a wirelessly transmitted signal and demodulate an Amplitude Shift Keying (ASK) signal coupled in by the transmitting end coil 211. The transmitting end coil 211 may be configured to generate magnetic induction with a receiving end coil 111 in the wireless charging receiving end 1 to send and receive wireless signals.

Returning to FIG. 1, the wireless charging receiving end 1 may include an energy receiver 11, a receiving end processor 12 and a wireless charging management chip 13.

In the present disclosure, as shown in FIG. 2, the energy receiver 11 may include the receiving end coil 111 and a receiving end capacitor 112. The receiving end coil 111 may be connected with the receiving end processor 12 through the receiving end capacitor 112, and may be configured to generate magnetic induction with the energy transmitter 21 (specifically the transmitting end coil 211) of the wireless charging transmitting end 2 to send and receive the wireless signals.

As shown in FIG. 1, the receiving end processor 12 is connected with the energy receiver 11 and the wireless charging management chip 13, and may be configured to convert the alternating current into the direct current and modulate and demodulate the wireless signals.

Figure 3:
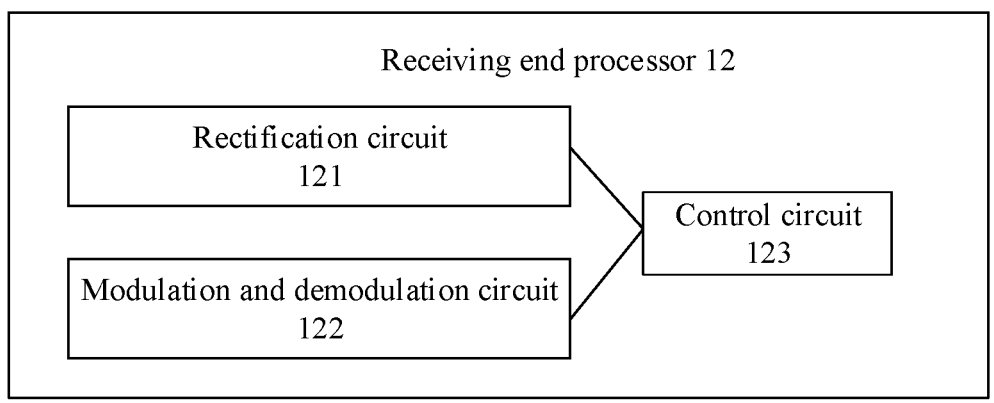
FIG. 3 is a block diagram of a receiving end processor, according to an embodiment of the present disclosure.

For example, as shown in FIG. 3, the receiving end processor 12 may include a rectification circuit 121, a modulation and demodulation circuit 122 and a control circuit 123. The rectification circuit 121 may be configured to convert the alternating current into the direct current. The modulation and demodulation circuit 122 may be configured to modulate and demodulate the wireless signals. The control circuit 123 is connected with the rectification circuit 121 and the modulation and demodulation circuit 122, and may be configured to control operation of the rectification circuit 121 and the modulation and demodulation circuit 122.

Returning to FIG. 1, the wireless charging management chip 13 may be connected with a battery 3, and may be configured to control charging of the battery 3.

Figure 4:
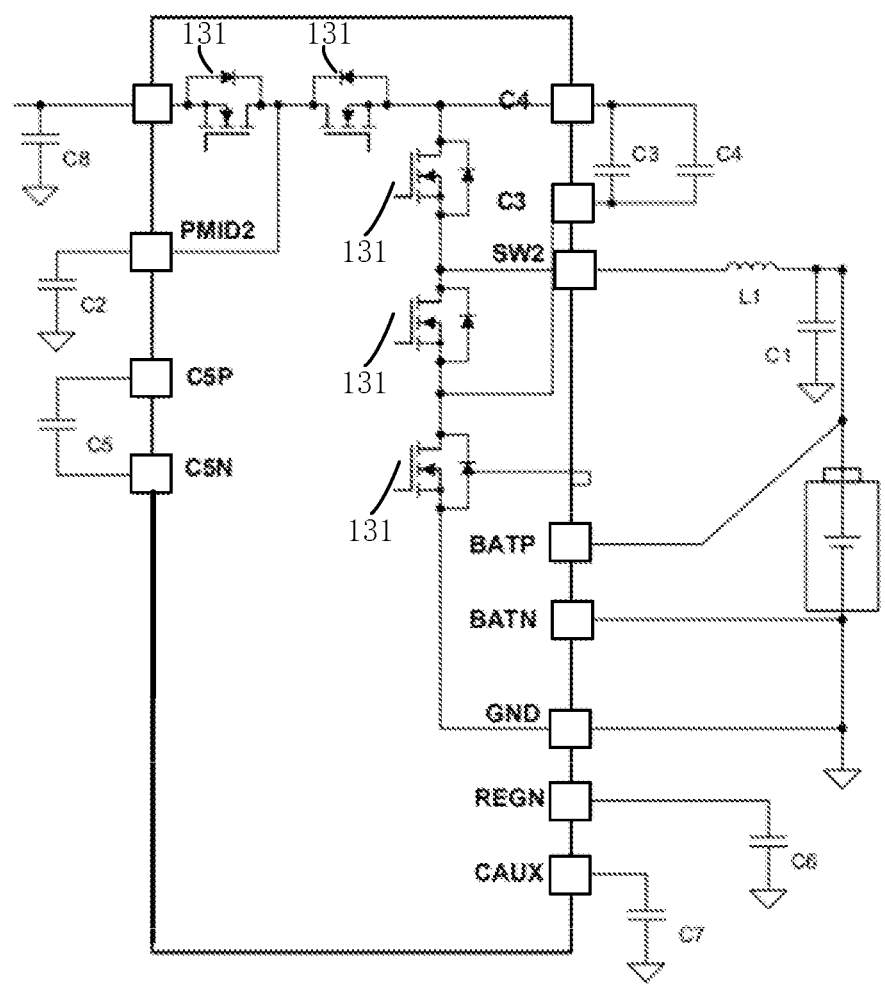
FIG. 4 is a structure diagram of a wireless charging management chip, according to an embodiment of the present disclosure.

In an embodiment, the wireless charging management chip 13 may include multiple MOSFETs (also referred to as MOS transistors) 131. For example, as shown in FIG. 4, the wireless charging management chip 13 is a 3-level charger, herein the 3-level charger includes five MOS transistors 131.

In addition, as shown in FIG. 1, the wireless charging management chip 13 may further be electrically connected with a terminal device system to supply power to the system.

A maximum input voltage allowed by the wireless charging management chip in the wireless charging receiving end is higher than a maximum input voltage allowed by a power management chip in the related art, so that an input voltage of the wireless charging management chip may be increased to improve charging power and charging efficiency, thus user experiences are improved. In addition, a terminal device may be charged quickly without any additional wired charging interface, so that the terminal device has better performance in terms of water resistance and safety.

Figure 5:
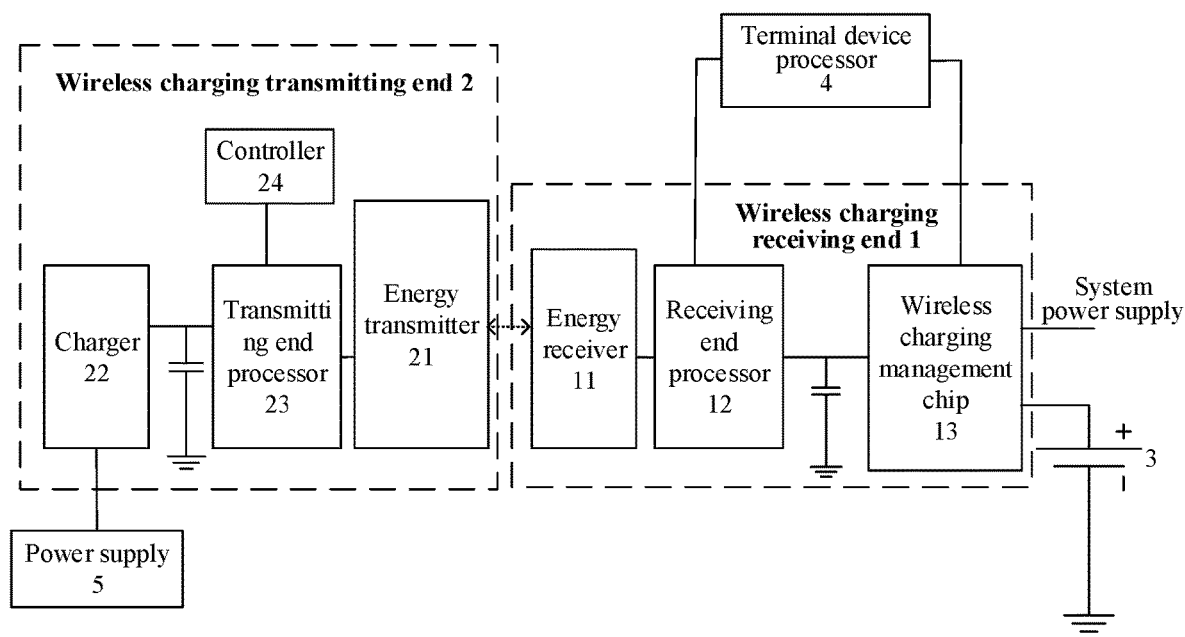
FIG. 5 is a block diagram of a wireless charging system, according to an embodiment of the present disclosure.

FIG. 5 is a block diagram of a wireless charging system, according to an embodiment. Referring to FIG. 5, the receiving end processor 12 and the wireless charging management chip 13 may be connected with a terminal device processor 4. The receiving end processor 12 may be configured to convert the alternating current into the direct current, demodulate the wireless signal received from the energy receiver 11 and modulate the wireless signal sent by the wireless charging management chip 13 through the terminal device processor 4.

Figure 6:
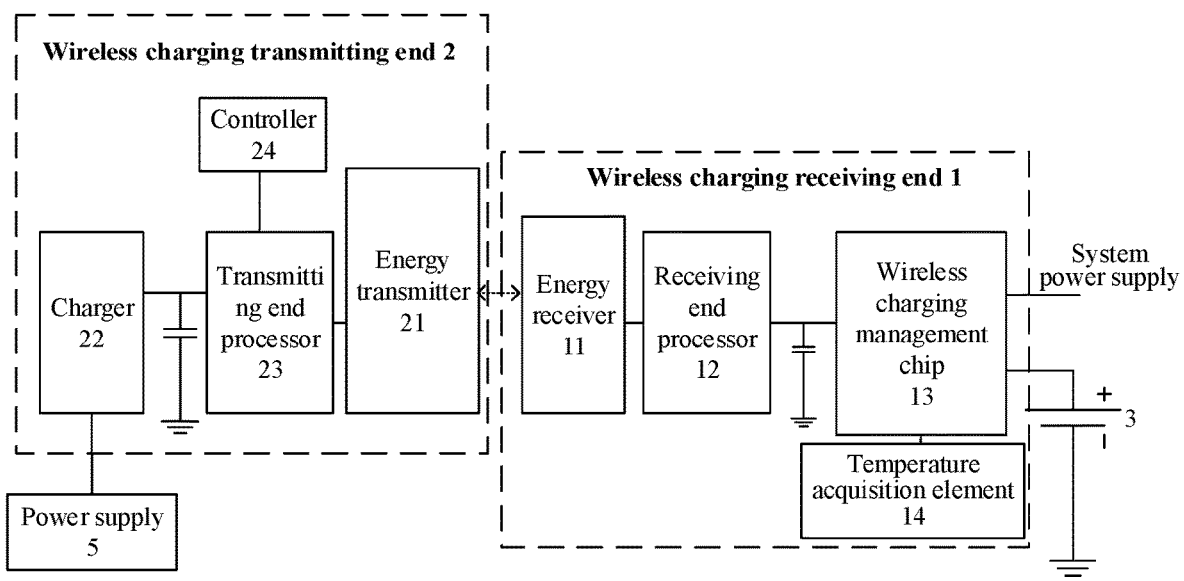
FIG. 6 is a block diagram of a wireless charging system, according to an embodiment of the present disclosure.

FIG. 6 is a block diagram of a wireless charging system, according to an embodiment. Referring to FIG. 6, the wireless charging receiving end 1 may further include a temperature acquisition element 14 (for example, a chip thermistor and an infrared temperature sensor) configured to acquire a terminal device temperature. The terminal device temperature may be a temperature of the battery 3, and may also be a temperature of the terminal device. Moreover, the wireless charging management chip 13 is connected with the temperature acquisition element 14, and may be configured to, when the terminal device temperature acquired by the temperature acquisition element 14 is greater than a preset temperature threshold value, decrease a present charging current and charge the battery 3 according to the decreased current. Therefore, overheat protection of the battery may be implemented, the battery and a rear shell of the terminal device may be prevented from excessively high temperatures, damage to service life of the battery is avoided, the overall temperature of the terminal device is also reduced, the charging efficiency, the degree of charging freedom and the charging speed are balanced and ensured, and the user experience is improved.

In addition, it is to be noted that the preset temperature threshold value may be a value set by a user and may also be a default empirical value (for example, 40 degrees) and there are no specific limits made in the present disclosure.

Figure 7:
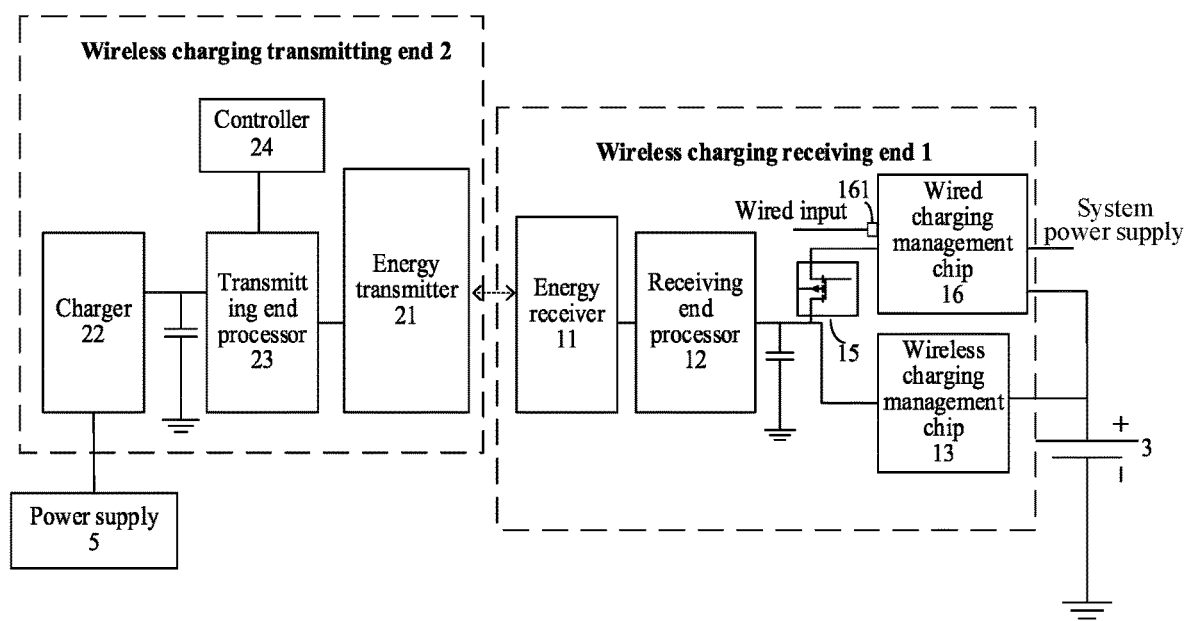
FIG. 7 is a block diagram of a wireless charging system, according to an embodiment of the present disclosure.

Moreover, for improving the charging efficiency and charging flexibility of the wireless charging receiving end 1, as shown in FIG. 7, the wireless charging receiving end 1 may further include a charging control switch 15 and a wired charging management chip 16.

The wireless charging management chip 13 is not connected with the wired charging management chip 16, and the charging control switch 15 may be connected respectively with the wireless charging management chip 13 and the wired charging management chip 16 so as to control the two chips respectively.

Alternatively, in the present disclosure, one end of the charging control switch 15 is connected with the receiving end processor 12 and the wireless charging management chip 13 (not shown in FIG. 7), while the other end is connected with the wired charging management chip 16. Moreover, the charging control switch 15 may be a single-pole single-throw switch, a relay, an MOSFET (the charging control switch 15 shown in FIG. 7 is an MOSFET) and the like. Alternatively, the charging control switch 15 is not connected with the wireless charging management chip 13 (as shown in FIG. 7).

One end of the wired charging management chip 16 is connected with the wireless charging management chip 13, while the other end is connected with the battery 3, and a wired charging interface 161 is formed in the wired charging management chip 16. In other words, in the case that the wired charging management chip 16 is connected with the wireless charging management chip 13 and the charging control switch 15 is connected with the wired charging management chip 16, the charging control switch 15 may be or may not be connected with the wireless charging management chip 13, if connected, the charging control switch 15 can directly control the wireless charging management chip 13; and if not connected, the charging control switch 15 can control the wireless charging management chip 13 via the wired charging management chip 16. Moreover, the wired charging management chip 16 may be configured to, when the charging control switch 15 is turned on or when the charging control switch 15 is turned off and the wired charging interface 161 is occupied, control charging of the battery 3.

In addition, the wireless charging management chip 13 may be configured to, when the charging control switch 15 is turned on or when the charging control switch 15 is turned off and the wired charging interface 161 is not occupied, control the battery 3 to be wirelessly charged. That is, when the charging control switch 15 is turned on, the wireless charging management chip 13 and the wired charging management chip 16 simultaneously control the battery 3 to be wirelessly charged; when the charging control switch 15 is turned off and the wired charging interface 161 is occupied, the wired charging management chip 16 controls the battery to be wirelessly charged, and the wireless charging management chip 13 does not work; and when the charging control switch 15 is turned off and the wired charging interface 161 is not occupied, the wireless charging management chip 13 controls the battery 3 to be wirelessly charged, and the wired charging management chip 16 does not work.

For example, the wired charging interface 161 may be a Universal Serial Bus (USB) interface, a Type-C interface and the like.

In addition, in the present disclosure, the wireless charging receiving end 1 may be arranged outside the terminal device, and when charging is required, the terminal device, after being mounted on the wireless charging terminal device 1, may be placed on the wireless charging transmitting end 2 for charging. This undoubtedly increases complexity in charging of the terminal device.

For reducing the complexity in charging of the terminal device, in another embodiment, the wireless charging receiving end 1 may be arranged in the terminal device. Then, when charging is required, the terminal device may directly be placed on the wireless charging transmitting end 2 for convenient and quick charging.

Figure 8:
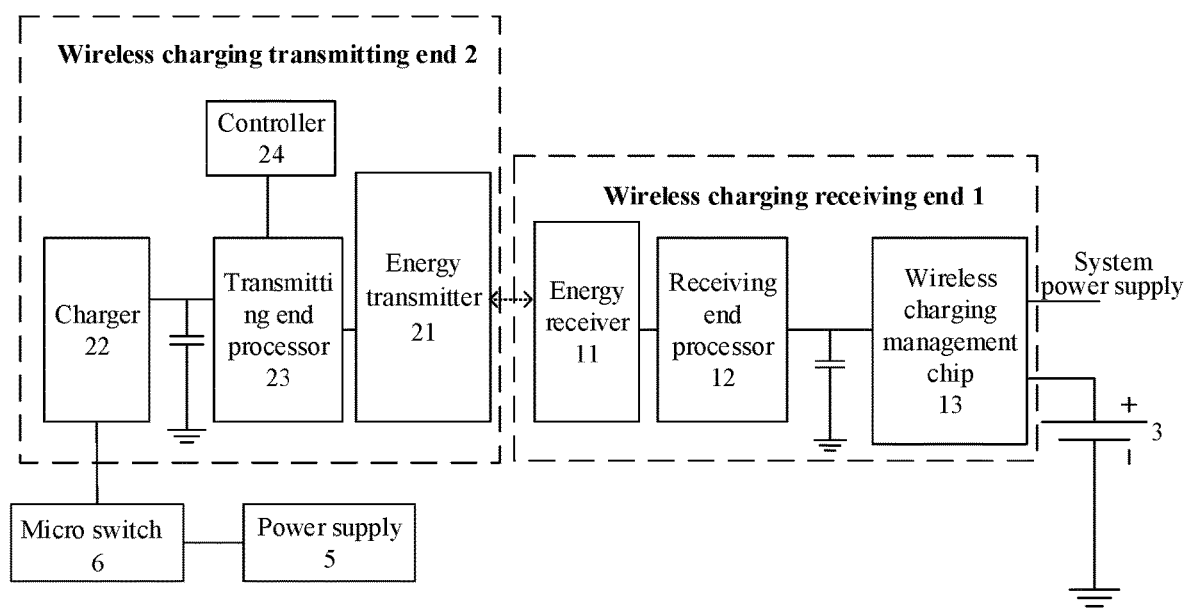
FIG. 8 is a block diagram of a wireless charging system, according to an embodiment of the present disclosure.

In addition, for improving safety in charging, as shown in FIG. 8, the wireless charging system may further include a micro switch 6.

In the present disclosure, the micro switch 6 may be arranged at a position, forming charging contact with the terminal device, on the wireless charging receiving end 1, and moreover, the wireless charging transmitting end 2 is connected with the power supply 5 through the micro switch 6. In such case, the terminal device, when being placed on the wireless charging receiving end 1, contacts with the micro switch 6, and then the micro switch 6 is triggered to be turned on to switch on the power supply 5 to start charging; and when the terminal device leaves the wireless charging transmitting end 2, the micro switch 6 is turned off to switch off the power supply 5 to stop charging.

The present disclosure also provides a terminal device, which may include a battery 3, a terminal device processor 4 and the abovementioned wireless charging receiving end 1.

Figure 9:
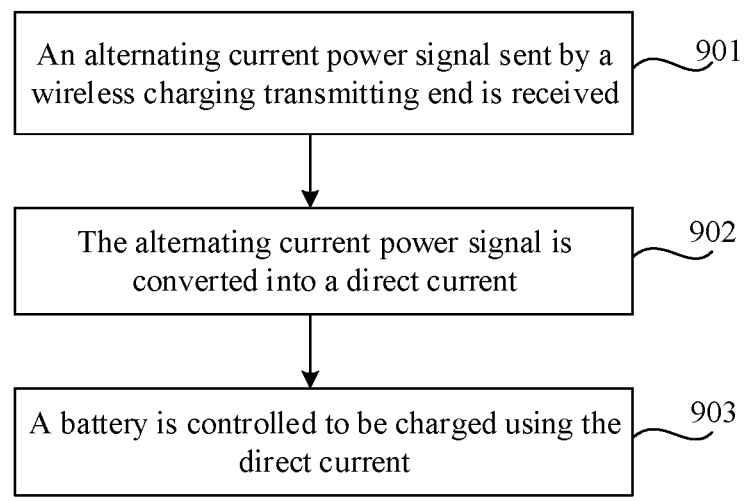
FIG. 9 is a flow chart showing a method for wireless charging, according to an embodiment of the present disclosure.

FIG. 9 is a flow chart showing a method for wireless charging, according to an embodiment. As shown in FIG. 9, the method for wireless charging may include the following operations.

In Operation 901, an alternating current power signal sent by a wireless charging transmitting end is received.

In Operation 902, the alternating current power signal is converted into a direct current.

In Operation 903, a battery is controlled to be charged using the direct current.

Figure 10:
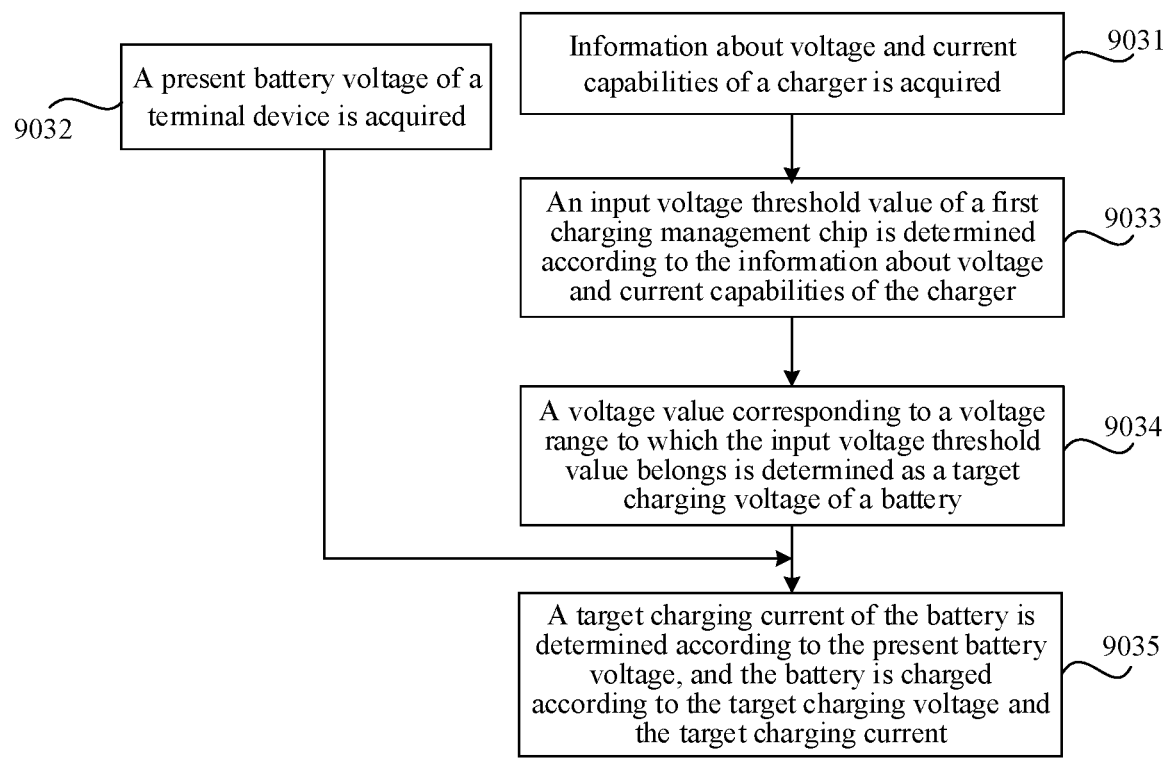
FIG. 10 is a flow chart showing a battery charging control method, according to an embodiment of the present disclosure.

For example, as shown in FIG. 10, Operation 903 may include Operation 9031 to Operation 9035 as follows.

In Operation 9031, information about voltage and current capabilities of a charger is acquired.

In the present disclosure, the information about voltage and current capabilities may include fixed Power Data Object (PDO) information and Augmented Power Data Object (APDO) information. For example, the fixed PDO information may be 5V/3A, 9V/2A, 12V/1.5A and the like. The APDO information may represent programmable voltage and current information, for example, 3-5.9V/3A. A wireless charging management chip may acquire the information about voltage and current capabilities through the charger in a wireless charging transmitting end. For example, after the wireless charging transmitting end establishes a connection with a wireless charging receiving end, the charger may send its own information about voltage and current capabilities to the wireless charging receiving end, and the wireless charging receiving end receives the information about voltage and current capabilities of the charger. In such a manner, the wireless charging management chip acquires the information about voltage and current capabilities of the charger.

In another embodiment, after the wireless charging transmitting end establishes the connection with the wireless charging receiving end, the wireless charging receiving end sends a request message requesting for acquisition of the information about voltage and current capabilities of the charger to the charger in the wireless charging transmitting end, the charger, after receiving the request message, sends its own information about voltage and current capabilities to the wireless charging receiving end, and the wireless charging receiving end receives the information about voltage and current capabilities of the charger. In such a manner, the wireless charging management chip acquires the information about voltage and current capabilities of the charger.

In Operation 9032, a present battery voltage of a terminal device is acquired.

In Operation 9033, an input voltage threshold value of a wireless charging management chip is determined according to the information about voltage and current capabilities of the charger.

In Operation 9034, a voltage value corresponding to a voltage range to which the input voltage threshold value belongs is determined as a target charging voltage of the battery.

In the present disclosure, after the information about voltage and current capabilities of the charger is acquired through Operation 9031, the input voltage threshold value Vrect of the wireless charging management chip may be determined accordingly, and then the voltage value corresponding to the voltage range to which the input voltage threshold value belongs may be determined as the target charging voltage of the battery. Moreover, the greater a lower limit value of the voltage range is, the smaller the voltage value corresponding to the voltage range is.

In an embodiment, the target charging voltage may be determined through prestored correspondences between voltage ranges and voltage values. In such a manner, after the input voltage threshold value Vrect of the wireless charging management chip is acquired, the voltage range to which the input voltage threshold value Vrect belongs may be determined at first, then the voltage value corresponding to the voltage range to which the input voltage threshold value Vrect belongs is determined through the prestored correspondences between voltage ranges and voltage values, and the corresponding voltage value is determined as the target charging voltage of the battery.

In another embodiment, the target charging voltage may be determined in the following manner:

when 5V≤Vrect<10V, the corresponding voltage value is a difference between the input voltage threshold value Vrect and a preset voltage value; when 10V≤Vrect<15V, the corresponding voltage value is a difference between Vrect/2 and the preset voltage value; when 15V≤Vrect<20V, the corresponding voltage value is a difference between Vrect/3 and the preset voltage value; and when Vrect≥20V, the corresponding voltage value is a difference between Vrect/N and the preset voltage value, the preset voltage value being greater than 0 and less than Vrect/N and N being an integer more than or equal to 4.

In addition, it is to be noted that the preset voltage value may be a value set by a user and may also be a default empirical value and there are no specific limits made in the present disclosure.

In Operation 9035, a target charging current of the battery is determined according to the present battery voltage, and the battery is charged according to the target charging voltage and the target charging current.

Figure 11:
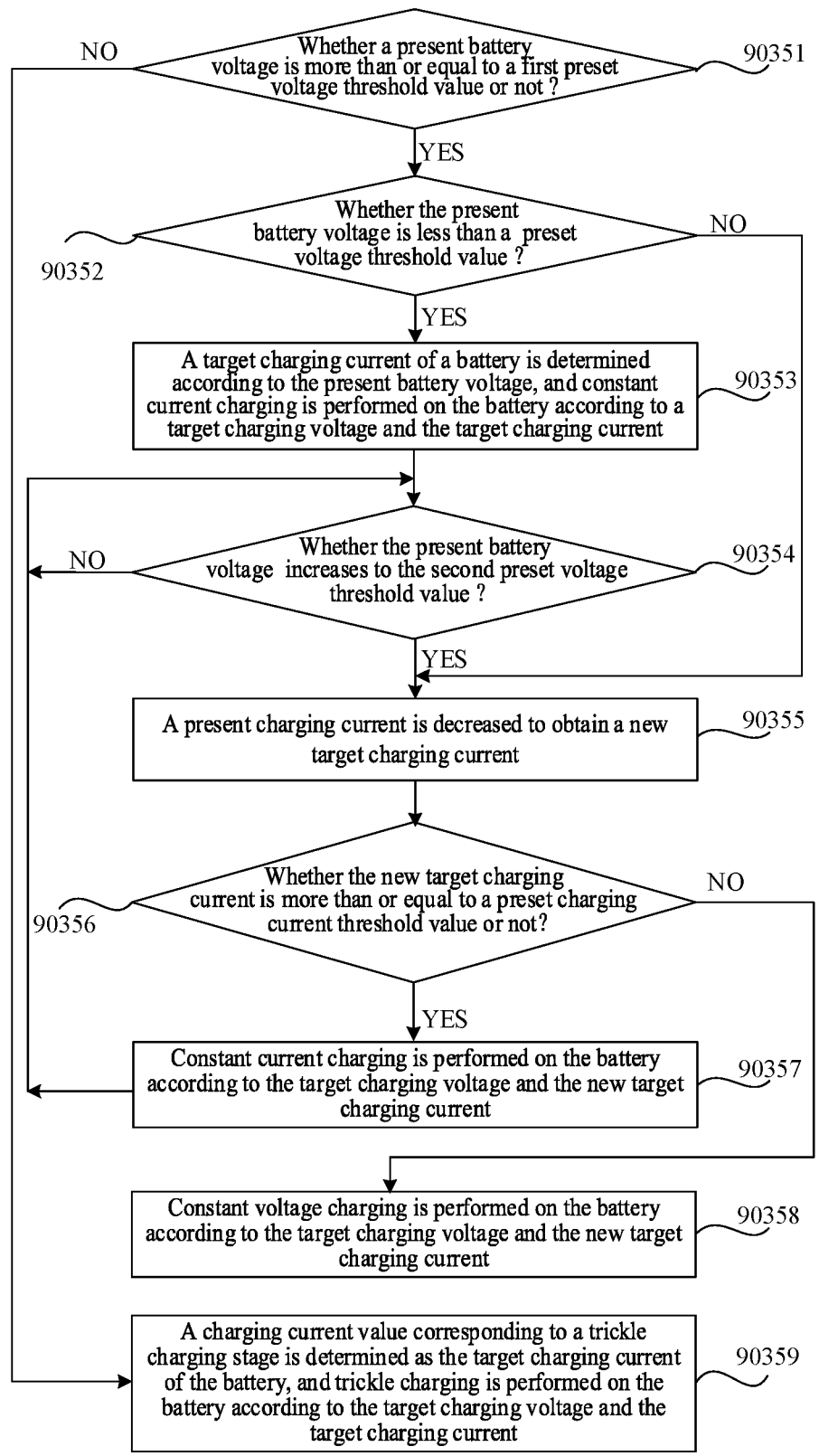
FIG. 11 is a flow chart showing a method for determining a target charging current of a battery, according to an embodiment of the present disclosure.

In the present disclosure, different target charging currents IBAT may be set according to different present battery voltages VBAT. In an embodiment, as shown in FIG. 11, Operation 9035 may include Operation 90351 to Operation 90359 as follows.

In Operation 90351, it is determined whether the present battery voltage is more than or equal to a first preset voltage threshold value or not.

In the present disclosure, after the present battery voltage of the terminal device is acquired through Operation 9032, it may be determined at first whether it is more than or equal to the first preset voltage threshold value (for example, 2.5V) or not. When the present battery voltage is more than or equal to the first preset voltage threshold value, it may be determined whether the present battery voltage is less than a second preset voltage threshold value (for example, 4.4V), namely Operation 90352 is executed. When the present battery voltage is less than the first preset voltage threshold value, a trickle charging stage may be entered, and in such case, a charging current value (for example, 45 mA) corresponding to the trickle charging stage may be determined as the target charging current and then trickle charging is performed on the battery according to the target charging current and the target charging voltage determined in Operation 9034, namely Operation 90359 is executed.

In addition, it is to be noted that the first preset voltage threshold value is less than the second preset voltage threshold value, moreover, all the first preset voltage threshold value, the second preset voltage threshold value and the charging current value corresponding to the trickle charging stage may be values set by the user and may also be default empirical values and there are no specific limits made in the present disclosure.

In Operation 90352, it is determined whether the present battery voltage is less than a second preset voltage threshold value.

In the present disclosure, when the present battery voltage is more than or equal to the first preset voltage threshold value and less than the second preset voltage threshold value, a constant current charging stage may be entered, and in such case, the target charging current of the battery may be determined according to the present battery voltage and constant current charging is performed on the battery according to the target charging current and the target charging voltage determined in Operation 9034, namely Operation 90353 is executed. When the present battery voltage is more than or equal to the second preset voltage threshold value, a present charging current may be decreased to obtain a new target charging current and, when the new target charging current is more than or equal to a preset charging current threshold value, constant current charging is performed on the battery according to the new target charging current and the target charging voltage determined in Operation 9034, namely Operation 90355 to Operation 90357 are executed.

In Operation 90353, the target charging current of the battery is determined according to the present battery voltage, and constant current charging is performed on the battery according to the target charging voltage and the target charging current.

In the present disclosure, a constant current charging process may include a pre-charging stage, a first constant current charging stage and a second constant current charging stage, specifically as follows.

(1) When the present battery voltage is more than or equal to the first preset voltage threshold value and less than a third preset voltage (for example, 3.0V), the pre-charging stage may be entered, and in such case, a first preset current (for example, 150 mA) is determined as the target charging current of the battery and constant current charging (i.e., pre-charging) is performed on the battery according to the target charging voltage determined in Operation 9034 and the target charging current.

(2) When the present battery voltage is more than or equal to a third preset voltage threshold value and less than a fourth preset voltage threshold value (for example, 3.6V), the first constant current charging stage may be entered, and in such case, a second preset current (for example, 1 A) may be determined as the target charging current of the battery and constant current charging (i.e., first-stage constant current charging) is performed on the battery according to the target charging voltage determined in Operation 9034 and the target charging current.

(3) When the present battery voltage is more than or equal to the fourth preset voltage threshold value and less than the second preset voltage threshold value, the second constant current charging stage may be entered, and in such case, a third preset current may be determined as the target charging current of the battery and constant current charging (i.e., second-stage constant current charging) is performed on the battery according to the target charging voltage determined in Operation 9034 and the target charging current.

In the present disclosure, the third current may be set according to a battery cell specification. For example, the third current may be 1C and 1.5C (for example, if a battery capacity is 1,800 mAh, 1C=1,800 mA and 1.5C=2,700 mA).

In addition, it is to be noted that the second current is greater than the first current, the third current is greater than the second current, moreover, the first current and the second current may be values set by the user and may also be default empirical values and there are no specific limits made in the present disclosure.

In Operation 90354, it is determined whether the present battery voltage increases to the second preset voltage threshold value.

In the constant current charging process, if the present battery voltage increases to the second preset voltage threshold value, the present charging current may be decreased to obtain the new target charging current; when the new target charging current is more than or equal to the preset charging current threshold value (for example, 1 A), the constant current charging is performed on the battery according to the new target charging current and the target charging voltage determined in Operation 9034, namely Operation 90355 to 90357 are executed; and then, Operation 90354 is re-executed until the new target charging current is less than the preset charging current threshold value.

If the present battery voltage does not increase to the second preset voltage threshold value, constant current charging is continued to be performed on the battery according to the target charging current determined in Operation 90353 and the target charging voltage determined in Operation 9034, and it is simultaneously determined whether the present battery voltage increases to the second preset voltage threshold value.

In addition, it is to be noted that the preset charging current threshold value may be a value set by the user and may also be a default empirical value and there are no specific limits made in the present disclosure.

In Operation 90355, a present charging current is decreased to obtain a new target charging current.

In an embodiment, the present charging current may be decreased by a preset current threshold value. The preset current threshold value may be a value set by the user and may also be a default empirical value and there are no specific limits made in the present disclosure.

In another embodiment, the present charging current may be decreased by a preset proportion (for example, 25%). The preset proportion may be a value set by the user and may also be a default empirical value and there are no specific limits made in the present disclosure.

In Operation 90356, it is determined whether the new target charging current is more than or equal to a preset charging current threshold value or not.

In the present disclosure, when the new target charging current is more than or equal to the preset charging current threshold value, constant current charging may be performed on the battery according to the new target charging current and the target charging voltage determined in Operation 9034, namely Operation 90357 is executed. When the new target charging current is more than or equal to the preset charging current threshold value, for preventing overcharging, constant current charging may be stopped, and a constant voltage charging stage is entered; and in such case, constant voltage charging may be performed on the battery according to the new target charging current and the target charging voltage determined in Operation 9034, namely Operation 90358 is executed.

In Operation 90357, constant current charging is performed on the battery according to the target charging voltage and the new target charging current.

In Operation 90358, constant voltage charging is performed on the battery according to the target charging voltage and the new target charging current.

In the present disclosure, in a constant voltage charging process, charging is performed in a manner of keeping the charging voltage substantially constant and gradually decreasing the charging current, and when the charging current is less than a preset charging stopping current (for example, 200 mA), charging may be stopped.

In addition, it is to be noted that the preset charging stopping current may be a value set by the user and may also be a default empirical value and there are no specific limits made in the present disclosure.

In Operation 90359, a charging current value corresponding to a trickle charging stage is determined as the target charging current of the battery, and trickle charging is performed on the battery according to the target charging voltage and the target charging current.

For example, different target charging currents IBAT may be set in the following manner.

In the trickle charging stage, when VBAT<2.5V, the target charging current IBAT is set to be 45 mA.

In the pre-charging stage, when 2.5V≤VBAT≤3.01V, the target charging current IBAT is set to be 150 mA.

In the first constant current charging stage, when 3.0V<VBAT<3.6V, the target charging current IBAT is set to be 1 A.

In the second constant current charging stage, when 3.6V≤VBAT<4.4V, the target charging current IBAT may be set (for example, 1C and 1.5C) according to the battery cell specification.

In a third progressive charging stage, when the VBAT reaches 4.4 V for the first time, the target charging current IBAT is decreased by 25%, and the second constant current charging stage is continued; when the VBAT reaches 4.4 V for the second time, the target charging current IBAT is continued to be decreased by 25%, and the second constant current charging stage is continued; and when the target charging current IBAT<1 A, the third progressive charging stage is stopped, and constant voltage charging is started.

In the fourth constant voltage charging stage, when the target charging current IBAT is less than 200 mA, charging is stopped.

In addition, it is to be noted that Operation 9032 may be executed before Operation 9031, may also be executed after Operation 9031 and may further be executed concurrently with Operation 9031 and there are no specific limits made in the present disclosure.

Figure 12:
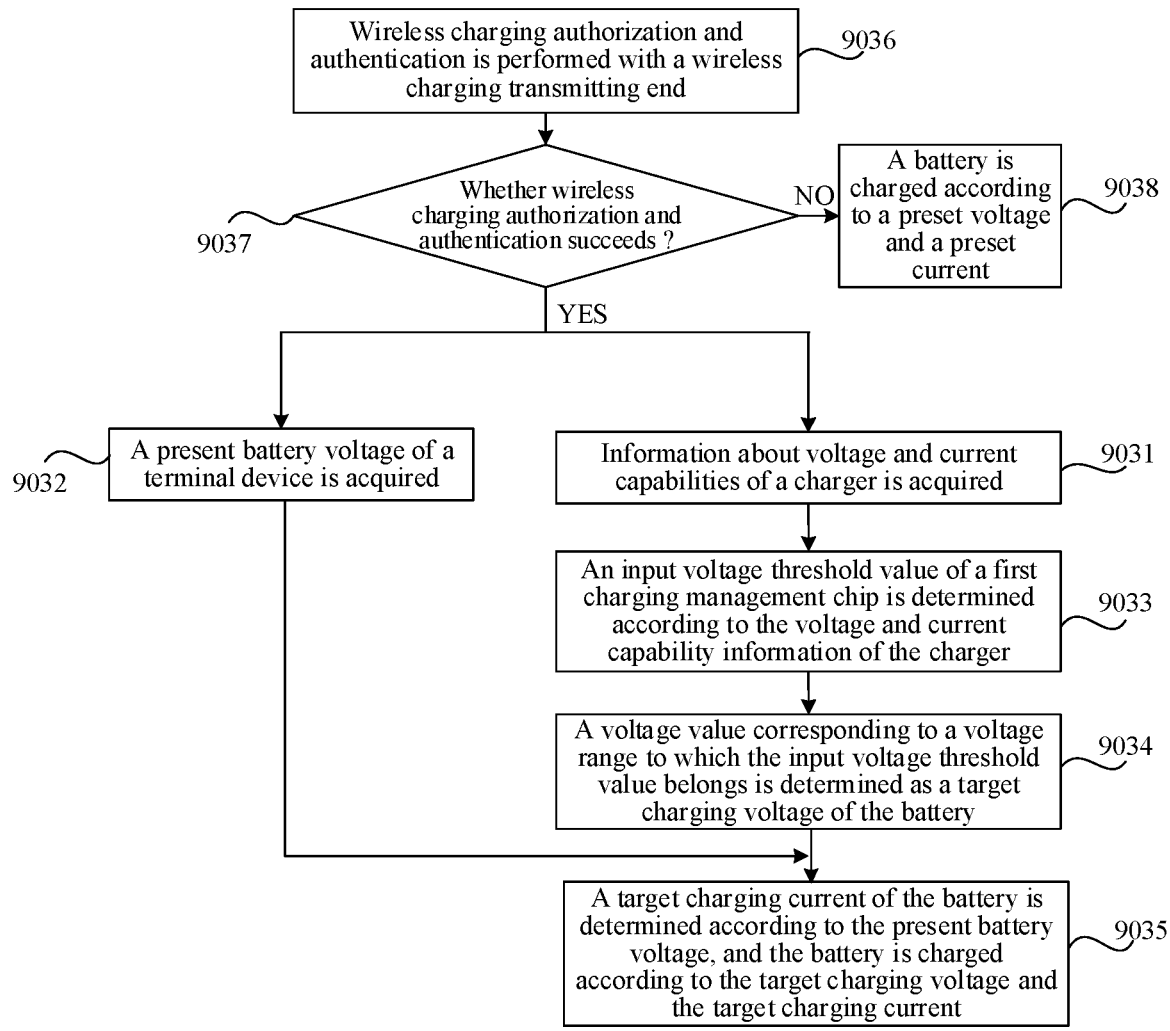
FIG. 12 is a flow chart showing a battery charging control method, according to an embodiment of the present disclosure.

In addition, for ensuring charging safety, wireless charging authorization and authentication may be performed at first before Operation 9031. For example, as shown in FIG. 12, the method may further include Operation 9036 to Operation 9038 as follows.

In Operation 9036, wireless charging authorization and authentication is performed with the wireless charging transmitting end.

A specific manner for wireless charging authorization and authentication is known to those skilled in the art, and thus will not be elaborated in the present disclosure.

In Operation 9037, it is determined whether wireless charging authorization and authentication succeeds.

In the present disclosure, when wireless charging authorization and authentication succeeds, quick wireless charging may be performed on the battery, namely Operation 9031 to Operation 9035 are executed; and when wireless charging authorization and authentication fails, normal wireless charging may be performed, namely Operation 9038 is executed.

In Operation 9038, the battery is charged according to a preset voltage and a preset current.

For example, the preset voltage is 5 V, and the preset current is 1 A.

It is to be noted that both the preset voltage and the preset current may be values set by the user and may also be default empirical values and there are no specific limits made in the present disclosure.

In addition, before wireless charging authorization and authentication, the following operations are further required to be executed: after the wireless charging transmitting end is connected with a power supply, the wireless charging transmitting end detects a type of the charger, the type of the charger being an ordinary Dedicated Charging Port (DCP) charger, a QC2.0 charger, a QC3.0 charger, a QC4.0 charger, a PD charger and the like; and then, when the wireless charging transmitting end establishes the connection with the wireless charging receiving end (for example, after the terminal device with a built-in wireless charging receiving end is placed on the wireless charging transmitting end), the terminal device interacts with the wireless charging transmitting end using a protocol of a QI specification (for example, a Baseline Power Profile (BPP) protocol and an Extended Power Profile (EPP) protocol).

In addition, the method may further include the following operations: when it is detected that a charging control switch is turned off and a wired charging interface is occupied, the battery is controlled to be wirelessly charged under control of a wired charging management chip; when it is detected that the charging control switch is turned off and the wired charging interface is not occupied, the battery is controlled to be wirelessly charged under control of the wireless charging management chip; and when it is detected that the charging control switch is turned on, the battery is controlled to be wirelessly charged under control of the wireless charging management chip and the wired charging management chip.

Other implementations of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as an example only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for wireless charging, comprising:
receiving an alternating current power signal sent by a wireless charging transmitting end;
converting the alternating current power signal into a direct current; and
controlling a battery to be charged using the direct current,
wherein controlling the battery to be charged comprises:
acquiring information of voltage and current capabilities of a charger;
acquiring a present battery voltage of a terminal device;
determining an input voltage threshold value of a wireless charging management chip according to the information of the voltage and current capabilities of the charger;
determining a target charging voltage of the battery, wherein the target charging voltage of the battery is a voltage value corresponding to a voltage range to which the input voltage threshold value belongs, wherein the greater a lower limit value of the voltage range is, the smaller the voltage value corresponding to the voltage range is;
determining a target charging current of the battery according to the present battery voltage of the terminal device; and
charging the battery according to the target charging voltage and the target charging current.

2. The method of claim 1, wherein determining the target charging current of the battery according to the present battery voltage and charging the battery according to the target charging voltage and the target charging current comprises:
when the present battery voltage is more than or equal to a first preset voltage threshold value and less than a second preset voltage threshold value:
determining the target charging current of the battery according to the present battery voltage; and
performing constant current charging on the battery according to the target charging voltage and the target charging current; and
repeatedly executing the following operations during the constant current charging until a new target charging current is less than a preset charging current threshold value:
if the present battery voltage increases to the second preset voltage threshold value, decreasing a present charging current to obtain the new target charging current and,
when the new target charging current is more than or equal to the preset charging current threshold value, performing the constant current charging on the battery according to the target charging voltage and the new target charging current;
when the new target charging current is less than the charging current threshold value, performing constant voltage charging on the battery according to the target charging voltage and the new target charging current.

3. The method of claim 1, further comprising:

when it is detected that a charging control switch is turned off and a wired charging interface is occupied, controlling the battery to be wirelessly charged under control of a wired charging management chip;

when it is detected that the charging control switch is turned off and the wired charging interface is not occupied, controlling the battery to be wirelessly charged under control of the wireless charging management chip; and when it is detected that the charging control switch is turned on, controlling the battery to be wirelessly charged under control of the wireless charging management chip and the wired charging management chip.

\* \* \* \* \*